United States Patent [19]

Jacobs et al.

[11] 4,059,771

[45] Nov. 22, 1977

[54] WIND ELECTRIC PLANT WITH IMPROVED ALTERNATOR FIELD EXCITATION

[76] Inventors: Marcellus L. Jacobs; Paul R. Jacobs, both of Rte. 11, Box 722, Fort Myers, Fla. 33901

[21] Appl. No.: 628,952

[22] Filed: Nov. 5, 1975

[51] Int. Cl.² .................................................. H02P 9/04
[52] U.S. Cl. ...................................... 290/44; 320/64; 322/35
[58] Field of Search ................. 290/44, 43, 54, 55; 322/28, 35, 31, 32, 27, 59, 75; 320/64, 68; 307/129

[56] References Cited

U.S. PATENT DOCUMENTS

| | | | |
|---|---|---|---|
| 3,718,849 | 2/1973 | Nolan et al. | 322/28 |
| 3,740,565 | 6/1973 | Wesley | 290/44 |
| 3,764,888 | 10/1973 | Anderson | 322/28 |
| 3,866,106 | 2/1975 | Taguchi et al. | 322/28 |
| 3,868,563 | 2/1975 | Hirata | 322/28 |
| 3,904,948 | 9/1975 | Earle | 320/64 |
| 3,921,052 | 11/1975 | Milano | 322/35 |
| 3,932,879 | 1/1976 | Pace | 322/28 |
| 3,967,186 | 6/1976 | Adams | 322/28 |
| 3,974,395 | 8/1976 | Bright | 290/44 |
| 3,983,471 | 9/1976 | Itoh et al. | 322/28 |

FOREIGN PATENT DOCUMENTS 17,006 of 1912 United Kingdom ................. 290/44

*Primary Examiner*—Robert K. Schaefer
*Assistant Examiner*—Eugene S. Indyk
*Attorney, Agent, or Firm*—Shoemaker and Mattare, Ltd.

[57] ABSTRACT

In a wind electric plant of the type including a wind-driven propeller or the like and an alternating current alternator connected to be driven thereby to generate electrical energy for charging storage batteries or other desired use, electrical circuitry connected with the alternator and a storage battery and including controls responsive to alternator speed and battery voltage to provide a relatively constant excitation current for the field winding of the alternator from a storage battery, whereby the alternator field is fully excited at substantially all speeds of operation thereof and the need for a conventional alternator exciter is eliminated.

6 Claims, 3 Drawing Figures

WIND ELECTRIC PLANT WITH IMPROVED ALTERNATOR FIELD EXCITATION

BACKGROUND OF THE INVENTION

This invention relates generally to wind electric plants, and more particularly to a wind electric plant of the type which includes a wind-driven propeller or the like connected to drive an alternator for producing electrical energy.

In prior art wind electric plants of the type noted above, the field windings of the alternator are excited by means of an exciter generator provided on the tower of the wind electric plant adjacent the alternator thereof. Accordingly, both the alternator and the exciter generator are supported at the top of the tower.

Wind electric plants must be capable of operating efficiently over a wide range of speeds, due to the wide range or variation in wind velocities used to drive the propeller or other power means of the wind electric plants. With conventional alternator exciters, it is very difficult to obtain sufficient field excitation at slow speeds without making the exciter generator relatively large in order to produce enough current for full field excitation at slow speed. However, when this is done, the exciter is considerably larger than needed at higher operating speeds, and accordingly, there is a substantial loss in propeller energy available for producing usable work. Additionally, the cost of the larger exciter generators is proportionately greater. Still further, with conventional arrangements wherein exciter generators are provided for exciting the field windings of the alternator, expensive service problems are encountered, due to the alternator and associated exciter generator being supported at the top of tall towers used in wind electric plants.

With the present invention, the conventional expensive exciter generator is eliminated, and the field windings of the alternator are excited from battery current. Thus, by utilizing direct current from a battery for exciting the field of the alternator, a relatively constant voltage is available from the battery for field excitation, and more importantly, full field excitation is easily obtained at all speeds of the alternator, including very slow speeds, and the alternator can thus produce full output at all wind velocities, including even very low wind speeds. This is a significant improvement over conventional arrangements, wherein the exciter generator has to develop considerable speed before it can fully excite the alternator field. Therefore, inasmuch as a wind electric plant must develop a full battery voltage in order to start charging the battery at slow speeds in order to utilize low wind velocities, the battery excitation system taught by applicant makes a much more ideal wind-driven alternator battery charging arrangement than any prior art arrangements known to applicant. A further important advantage of the invention is that the alternator field voltage control can be located near the batteries for easy inspection and service, rather than at the top of a tower at the alternator location. Moreover, the current drawn from the battery for field excitation is only what is needed at each speed of operation of the alternator, and since the alternator itself is considerably more efficient than the exciter generator in producing electrical energy, the alternator in the system taught by applicant can replace any battery current used in its field more efficiently from the available wind energy than can a conventional exciter, and thus the generating system of applicant is able to deliver considerably more electrical energy to the battery and to a power line or other desired use than are conventional arrangements.

OBJECTS OF THE INVENTION

Accordingly, it is an object of this invention to provide a wind electric plant of the type including an alternator driven by a propeller or the like for producing electrical energy, and wherein means is provided for exciting the field windings of the alternator in a manner to obtain substantially full excitation of the field windings at all operating speeds of the alternator.

Another object of the invention is to provide a wind electric plant of the type including a wind-driven propeller connected for operating an alternator or the like for producing electrical energy, and wherein the field of the alternator is excited from battery current.

A further object of the invention is to provide a wind electric plant of the type including a wind-driven propeller or the like connected to operate an alternator or the like for producing electrical energy, wherein the conventional exciter generator is eliminated and the alternator is connected with a storage battery for exciting the field of the alternator from the relatively constant voltage output of the battery.

A still further object of the invention is to provide a wind electric plant of the type including a wind-driven propeller or the like connected to operate an alternator or the like for producing electrical energy, wherein the conventional exciter generator is eliminated and a storage battery is connected with the field windings of the alternator for exciting the field of the alternator, and wherein controls are provided for regulating the current applied to the field to excite the field only as needed and at the same time obtain substantially full excitation of the field at all operating speeds of the alternator.

Yet another object of the invention is to provide a field current regulator for an exciterless alternator, wherein the alternator is connected with a storage battery for charging the storage battery and the battery is connected with the field of the alternator to excite the field thereof and controls are provided for regulating the field current applied to the field of the alternator to thereby regulate the voltage applied in charging the battery.

DETAILED DESCRIPTION OF THE INVENTION

Figure 1:
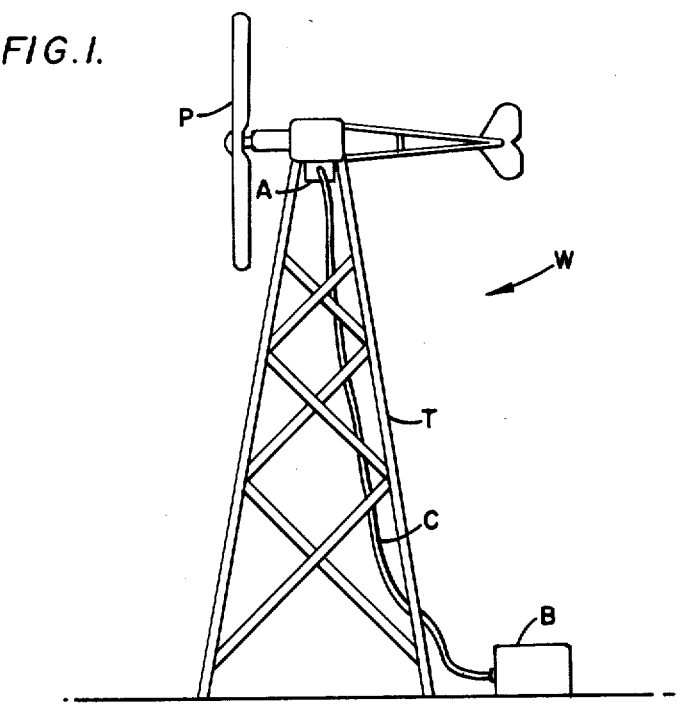
FIG. 1 is a somewhat schematic view in elevation of a wind electric plant in accordance with the invention, showing the wind-driven propeller or the like and alternator at the top of the tower and the storage battery and controls for the alternator at the bottom of the tower.

In the drawings, wherein like reference numerals indicate like parts throughout the several views, a wind electric plant in accordance with the invention is indicated generally at W and includes a tower T having a propeller or the like P supported at the top thereof and connected to operate an alternator A.

In a preferred form of the invention, the alternator comprises a three phase alternating current alternator. A cable C connects the alternator A with the regulator and battery B at the bottom of the tower.

Figure 2:
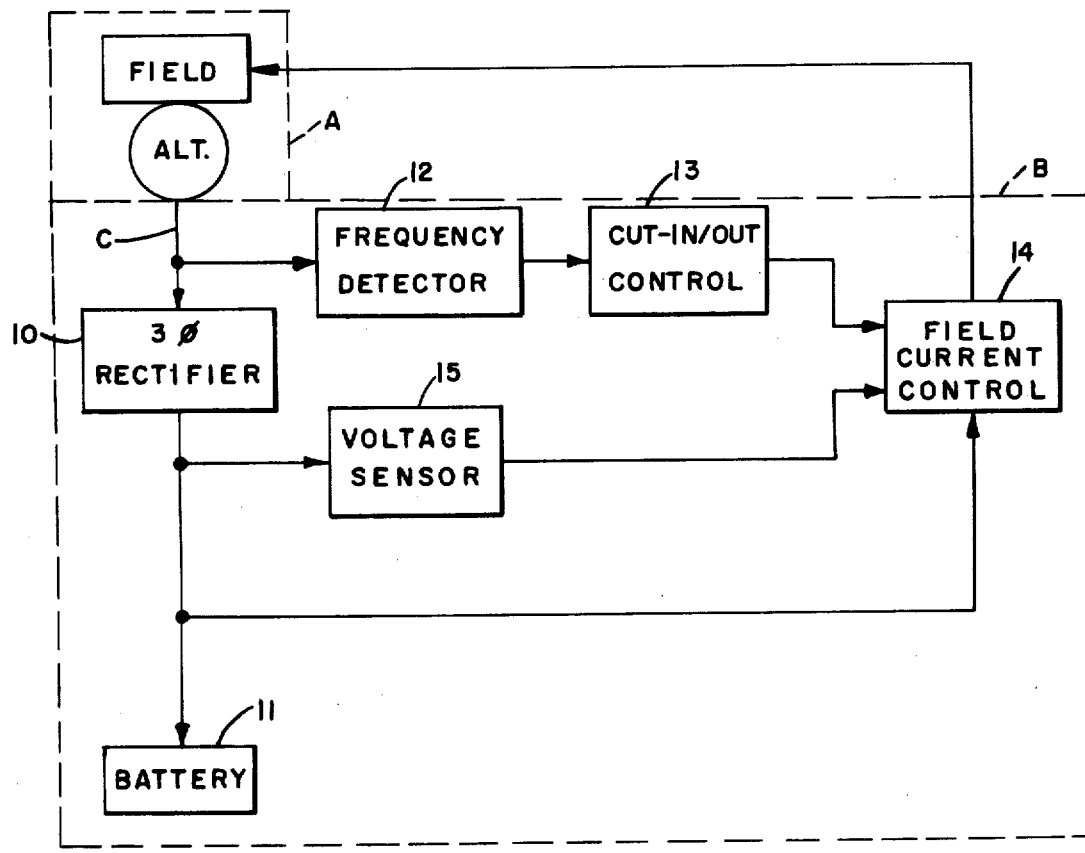
FIG. 2 is a block diagram of the alternator, battery and controls for the field current of the alternator.

As seen in FIG. 2, the alternating current output of the alternator is connected via cable C with a three phase rectifier 10. The rectified voltage is then supplied to a storage battery or bank of storage batteries or the like 11.

The alternating current output of the alternator, which is directly proportional to the alternator speed, is also continuously monitored by a frequency detector 12, and the output of the frequency detector is connected with a cut-in/out control 13. The frequency detector senses the frequency of the alternator and produces an output signal which operates a switch means in the cut-in/out control whenever the frequency exceeds a predetermined value to apply a signal to a field current control means 14 enabling or activating the field current control means.

The rectified output of the alternator is connected with a voltage sensor 15, which senses the terminal voltage of the battery and when the terminal voltage of the battery reaches a predetermined level, the voltage sensor is operative to send a signal to the field current control, which, having previously been enabled by the frequency detector and cut-in/out control, applies a desired level of current to the field of the alternator to excite the field, thereby to produce a desired output therefrom to obtain proper charging of the battery 11.

Figure 3:
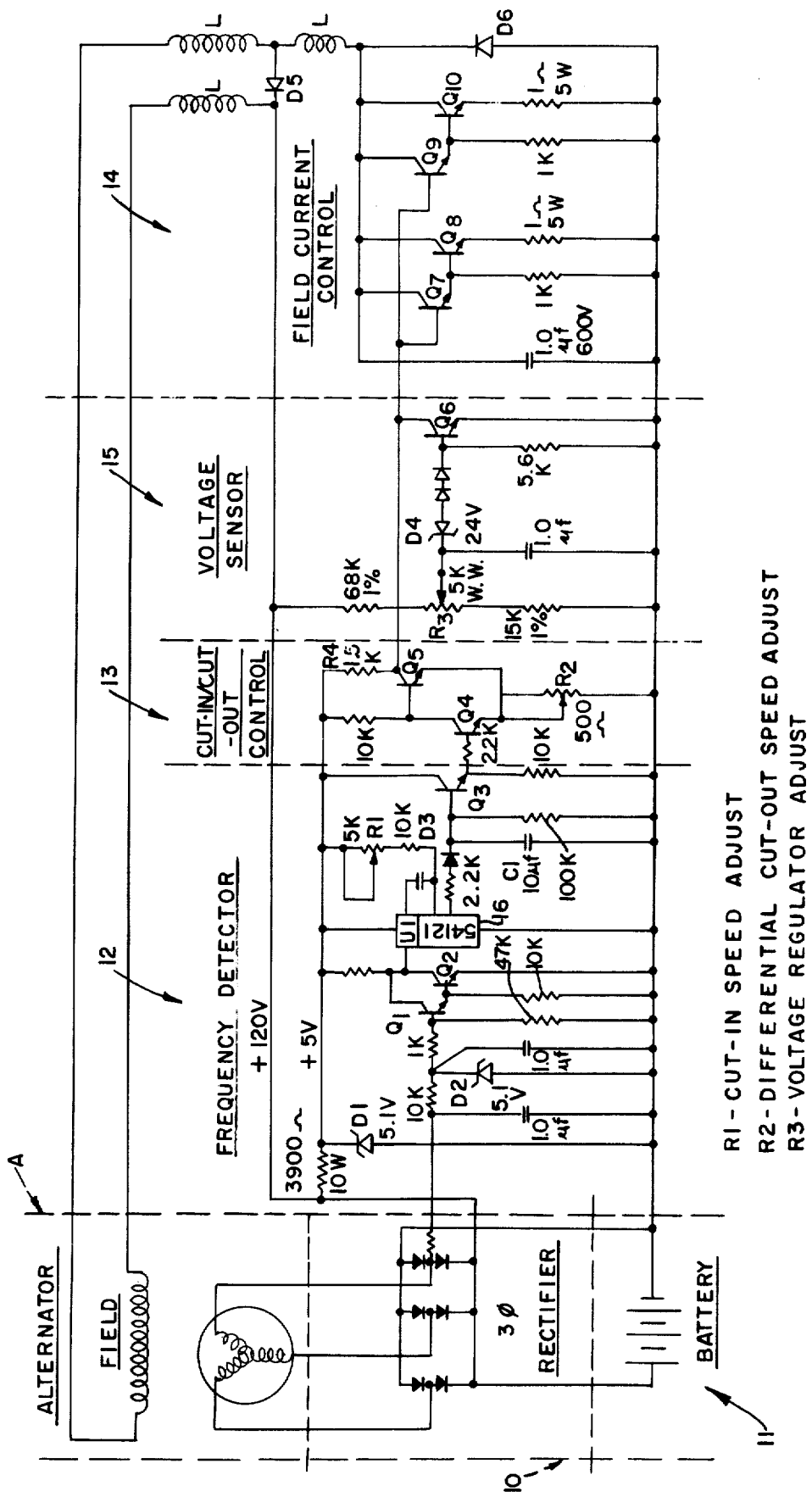
FIG. 3 is a schematic view of the circuit for the exciterless alternator arrangement of the invention.

As seen in FIG. 3, the three phase rectifier is connected with the primary output of the alternator to rectify the alternating current output of the alternator and use the rectified output to charge the battery 11.

The frequency detector 12 includes a zener diode D2 connected across the input to the frequency detector to limit the maximum swing of the alternating current input to the frequency detector from the alternator to five volts. The thus limited alternating current input is applied to the base of a transistor Q1, which, together with transistor Q2, comprises a switch which has its output connected with monostable U1 of integrated circuit chip 16, whereby the monostable U1 is triggered once for each pulse received from the alternator. The integrated circuit chip thus produces a fixed amplitude pulse, whose width is adjustable by means of resistor R1, and these pulses are supplied to and stored in an integrating capacitor C1. The average voltage across capacitor C1 is therefore proportional to the number of pulses per minute, i.e., the revolutions per minute of the alternator. Diode D3 and transistor Q3 prevent the capacitor C1 from discharging between pulses.

Switching action is achieved by a pair of emitter coupled transistors Q4 and Q5. The switching threshold of transistor Q4 is set to a desired value, and when the voltage across capacitor C1 exceeds a given equivalent alternator RPM, transistor Q4 is triggered and transistor Q5 abruptly switches off, allowing the voltage through resistor R4 to be available to the field current control circuit 14. The resistor R2 permits adjustment of the amount that the alternator RPM must decrease before the switch reverts to its initial state. In this regard, the resistor R4 is connected in common to the collectors of both transistors Q5 and Q6, and the voltage across resistor R4 is also the only source of base or turn-on current for the field control transistors Q7, Q8, Q9 and Q10. Thus, either transistor Q5 or transistor Q6 can reduce or turn off the field control current.

The transistor Q6 is controlled by the difference between the scaled battery voltage at resistor R3 and zener reference diode D4. In other words, when the voltage at the wiper of resistor R3 exceeds the value of zener diode D4, transistor Q6 is turned on, thus reducing the field control current available from resistor R4 as required to prevent any further increase in battery voltage.

The transistors Q7, Q8, Q9 and Q10 are connected to form two identical series current regulators operated in parallel to reduce the amount of heat dissipated in each transistor. Inductors L in conjunction with diodes D5 and D6 are connected with the field current control circuitry to reduce the possibility of damage to the regulator components by transient voltages.

Thus, in accordance with the present invention, the field winding of the alternator is excited by the relatively constant DC current from battery 11, and the charging voltage applied to the battery, as well as the field excitation current, are regulated in response to both the frequency of the alternator and the resultant voltage output level therefrom.

The specific resistor, capacitor and diode values indicated on the schematic diagram are examples of one operative embodiment only, and these values could change depending upon the particular application of the circuit.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

We claim:

1. In a wind electric plant of the type including a wind driven propeller or the like supported at the top of a tower and connected to drive an alternator supported on the tower to generate electrical energy, and storage battery means connected to be charged by the alternator, the improvement comprising: electrical control circuit means connecting the storage battery means with the field winding of the alternator to supply a substantially constant current to the field winding at substantially all speeds of operation of the wind electric plant within a predetermined range of speeds to excite the field of the alternator and thus obtain full excitation of the alternator field at substantially all speeds of operation of the wind electric plant within said range.

2. A wind electric plant as in claim 1, wherein a full wave bridge rectifier is connected between the output of the alternator and the storage battery means to rectify the alternating current output of the alternator.

3. A wind electric plant as in claim 2, wherein said electrical control circuit means includes frequency control means connected to regulate the field current applied to the alternator field in response to predetermined minimum and maximum frequencies of operation of the alternator.

4. A wind electric plant as in claim 3, wherein said electrical control circuit means includes a voltage level control means connected across the battery terminals to regulate the field current applied to the alternator field in response to the charging voltage applied to the battery means by the alternator output.

5. A wind electric plant as in claim 1, wherein said electrical control circuit means includes a frequency detector connected with the alternator output to sense the frequency of the alternator and develop a signal representative thereof, a switching means connected with the frequency control means to receive the signals therefrom and operative in response thereto to develop output pulses representative of a predetermined frequency range, a normally disabled field current control means connected with the output of the switching means to receive the signals therefrom and enabled in response to the signals, a rectifier connected with the output of the alternator to rectify the alternating current alternator output, and a voltage sensor connected to receive the rectified output and including means to sense the charging voltage applied to the battery means and operative to develop an output signal in response thereto, said voltage sensor output connected with the field current control means to regulate the amount of current applied to the field of the alternator to thus prevent excessive battery voltage.

6. A wind electric plant as in claim 5, wherein the frequency detector includes a zener diode connected across the input thereto from the alternator to limit the input to a maximum swing of five volts, a pair of transistors connected to receive the limited input, and having their output connected to an integrated circuit chip which develops a fixed amplitude pulse in response to pulses developed by revolution of the alternator, a variable resistor connected with the integrated circuit to vary the width of the pulses developed thereby, and a storage capacitor connected with the output of the integrated circuit to receive the pulses and store them to obtain an average voltage across the capacitor proportional to the number of pulses per minute of the alternator, a second pair of transistors connected with the capacitor and triggered upon discharge of the capacitor, one of the transistors of said second pair having a threshold selected such that it is turned on when the voltage across the capacitor exceeds a given RPM equivalent of the alternator, and connected to turn the other transistor of said pair of transistors off, thus enabling current flow to the bases of four additional transistors connected together to form two identical series current regulators operated in parallel, and a variable resistor connected across the terminals of the battery and having a tap therefrom connected through a zener diode to the base of a further transistor, whereby when the voltage at the tap of the variable resistor exceeds the value of the zener diode, the further transistor is turned on, said further transistor being shunted across the series current regulators to reduce the field control current available to the field winding of the alternator to thereby prevent any further increase in charging voltage to the battery.

* * * * *